United States Patent [19]
Fenton

[11] 3,964,781
[45] June 22, 1976

[54] COVER ASSEMBLY FOR OPEN TOP TRUCK BODIES

[76] Inventor: Russell R. Fenton, P.O. Box 151, Bucklin, Kans. 67834

[22] Filed: June 3, 1974

[21] Appl. No.: 475,950

[52] U.S. Cl. .................... 296/100; 52/63; 160/84 R
[51] Int. Cl.² .................... B60P 7/04
[58] Field of Search .......... 296/100, 101, 137 B, 296/104, 105; 160/84 R; 47/17; 52/63, 64; 105/377; 293/62

[56] References Cited
UNITED STATES PATENTS

| | | | |
|---|---|---|---|
| 2,355,794 | 8/1944 | Gentry | 296/104 X |
| 2,465,302 | 3/1949 | Westmoreland et al. | 296/105 |
| 2,565,746 | 8/1951 | Turner | 296/104 |
| 2,757,042 | 7/1956 | Schultz | 296/100 |
| 2,807,499 | 9/1957 | Duddleston | 296/100 |
| 2,969,284 | 1/1961 | Ambli | 296/100 |
| 3,041,104 | 6/1962 | Richard | 296/100 |
| 3,066,974 | 12/1962 | Ambli | 296/100 |
| 3,179,464 | 4/1965 | McBurney et al. | 296/100 |
| 3,510,996 | 5/1970 | Popil | 160/84 R X |
| 3,560,045 | 2/1971 | Finneman | 296/137 B |

*Primary Examiner*—Robert J. Spar
*Assistant Examiner*—Donald W. Underwood
*Attorney, Agent, or Firm*—Gravely, Lieder & Woodruff

[57] ABSTRACT

A cover assembly for covering an open top of a truck body includes a frame which attaches to the truck body and extends over the open top thereof. A cover is attached at its front end to the front of the frame and at its rear end to endless cables extended along the sides of the frame. The cables are trained around sheaves which are mounted on the frame at the front and rear thereof. The sheaves at the front of the frame are on a common axle which is powered by suitable drive means in both directions. In one direction of movement, the cover will accumulate in folds and will eventually be located in a compact condition over the front of the frame. In the other direction of movement, the cover will unfold and spread out over the frame.

1 Claim, 6 Drawing Figures

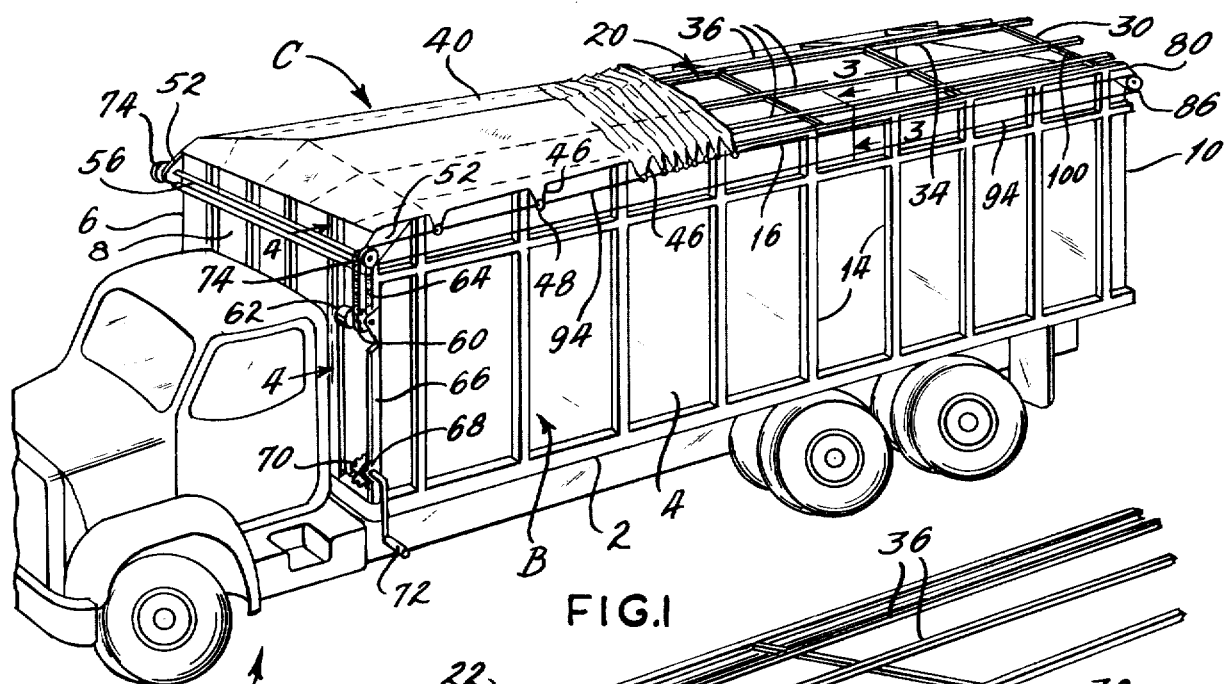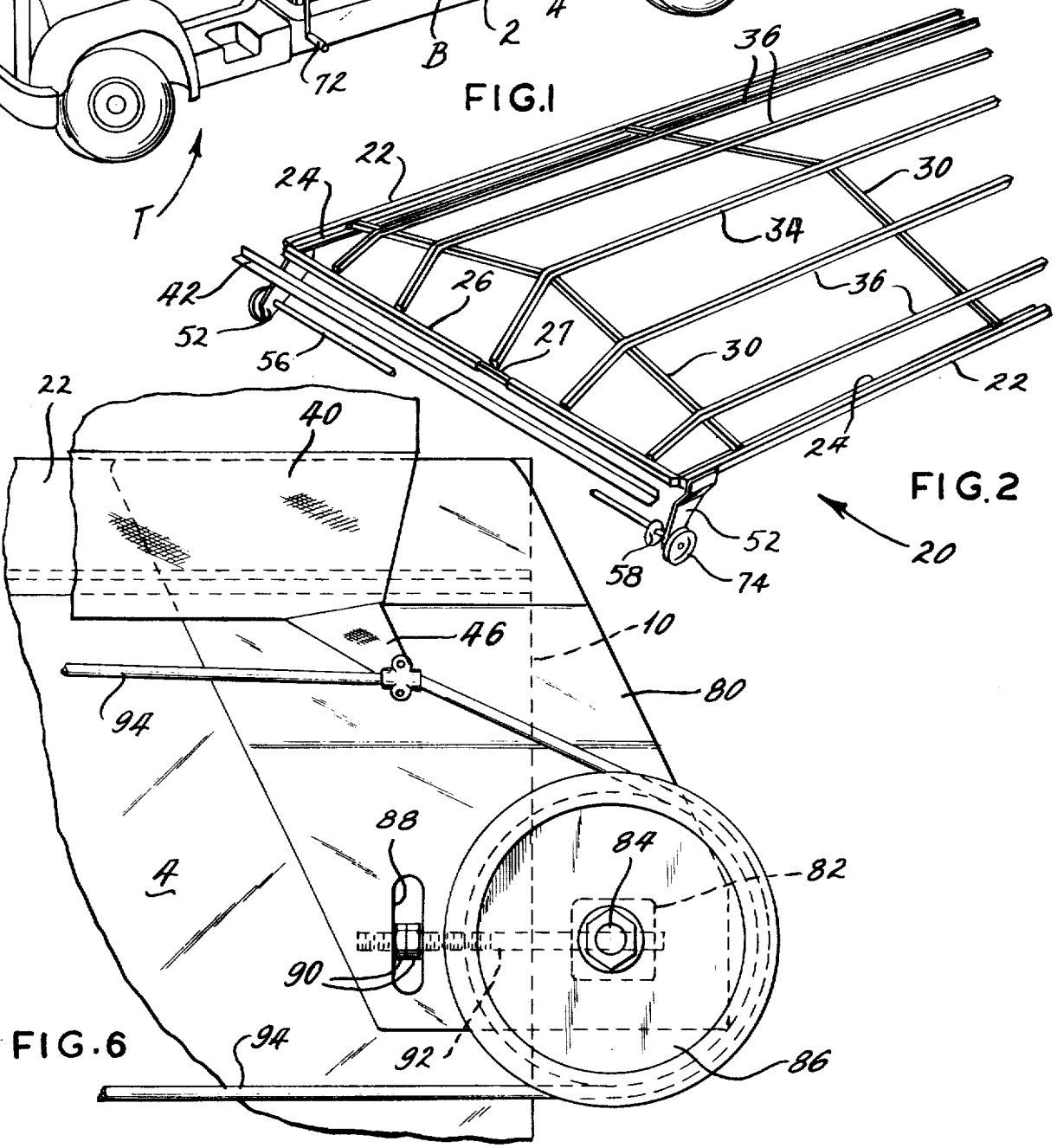

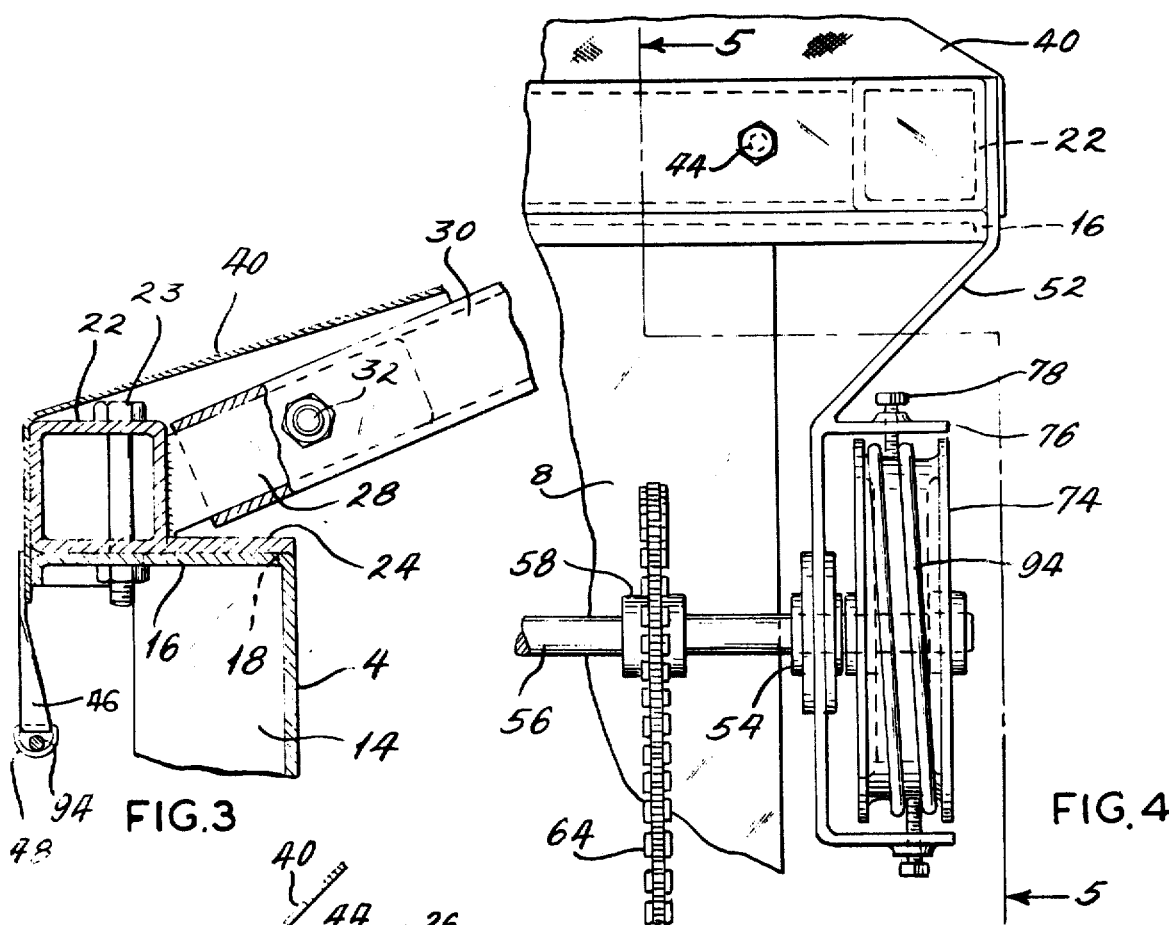
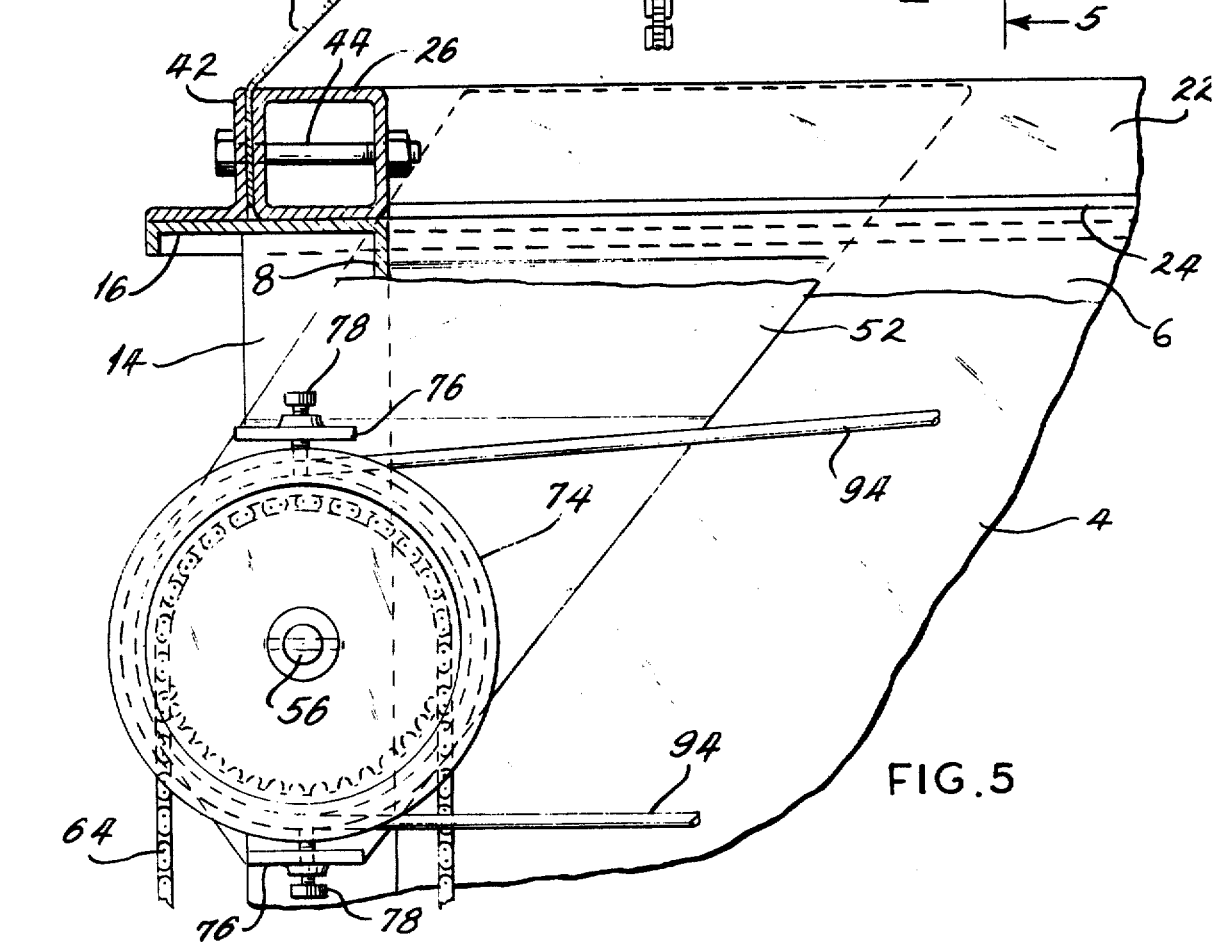

3,964,781

COVER ASSEMBLY FOR OPEN TOP TRUCK BODIES

BACKGROUND OF THE INVENTION

This invention relates in general to covers and more particularly to a cover assembly for an open top truck body.

Grain is normally transported from the farm to elevators or mills in large trucks, the bodies of which have open tops to facilitate loading. Normally, these trucks traverse the grain fields alongside harvesting machines such as combines with the discharge chutes of the harvesting machines directed into the open tops of the truck bodies. While open tops are essential for loading, they are quite detrimental on the highway, since wind passing over the open top of a truck body will blow a substantial amount of the grain out of the truck body. Furthermore, rain can enter the truck body and destroy much of the grain. To avoid these problems, most operators of grain trucks place large tarpaulins over the open tops of their truck bodies.

The installation of a tarpaulin on a truck body, which can be as large as 8 feet by 24 feet, is not an easy task and indeed often demands the labor of several individuals. The task is particularly difficult on windy days which are not unusual in the major grain producing areas of North America. While removing a tarpaulin is not as difficult as installing one, it is still a time consuming task which may create problems at elevators where the trucks are unloaded.

Finally, even when the truck body is empty a tarpaulin is desirable since it streamlines the truck body and saves fuel while driving at highway speeds. However, tarpaulins are often not used in such instances, merely because they are so difficult to install.

SUMMARY OF THE INVENTION

One of the principal objects of the present invention is to provide a cover assembly for closing the top of an open top truck body. Another object is to provide a cover assembly of the type stated in which the cover is easily and quickly emplaced over the body. A further object is to provide a cover assembly of the type stated in which the cover can easily be emplaced or removed by one person. An additional object is to provide a cover assembly of the type stated which does not interfere with the loading of grains into the truck body and permits the grain to be heaped in the truck body. Still another object is to provide a cover assembly which is sold as a unit and includes a frame which is easily bolted to the truck body. Yet another object is to provide a cover assembly of the type stated which will permit large objects such as machinery to be loaded into the truck body by means of a hoist. These and other objects and advantages will become apparent hereinafter.

The present invention is embodied in a cover assembly for covering an open top truck body and includes a frame which mounts on the body and a cover which is secured to the frame at one end and can be spread over the frame to cover the open top of the truck body. Endless cables are located along the sides of the frame and the opposite end of the cover is connected to these cables. Drive means move the cables which in turn move the cover between folded and unfolded conditions. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a perspective view of a truck provided with a cover assembly constructed in accordance with and embodying the present invention;

FIG. 2 is a perspective view of the frame forming part of the cover assembly;

FIG. 3 is a sectional view taken along lines 3—3 of FIG. 1 and showing the side rails;

FIG. 4 is an end view taken along lines 4—4 of FIG. 1 and showing the left front corner of the cover assembly;

FIG. 5 is a sectional view taken along lines 5—5 of FIG. 4; and

FIG. 6 is a fragmentary elevational view of the extreme rear end of the cover assembly.

DETAILED DESCRIPTION

Referring now to the drawings, a truck T (FIG. 1) has a body B including a bed 2 at the bottom thereof, sidewalls 4 and 6 extended upwardly from the bed 2, and front and rear end walls 8 and 10 connecting the ends of the sidewalls 4 and 6 and likewise extended upwardly from the bed 2. The body B has an open top and supports a cover assembly C for closing the open top if desired.

The sidewalls 4 and 6 and end walls 8 and 10 are formed from sheet steel reinforced with vertical ribs 14. At the upper ends of the walls 4, 6, 8 and 10, the sheet steel is turned outwardly to form a peripheral flange 16 (FIG. 3) along the top of the body B and while the width of this flange varies between manufacturers, it is usually on the order of 3 inches. At the upper end of each rib 14, the flange 16 has a rectangular aperture 18 which opens into the hollow interior of the rib 14 to form a stake hole capable of receiving stakes for elevating the walls 4, 6, 8 and 10 of the body B. The truck T has hydraulic cylinders beneath the bed 2 for elevating the front of the body B so as to place the bed 2 at a considerable incline. The rear end wall 10 contains a removable panel so that grain will flow out of the body B when it is inclined.

The cover assembly C includes a frame 20 (FIG. 2) which rests on the peripheral flange 16 of the body B and extends over the open top of the body B to create a grid which is raised at its center about 13 inches above its sides. This grid does not interfere with the loading of grain into the body B. In particular, the frame 20 includes a pair of longitudinal side rails 22 (FIG. 3) which are secured against the upper faces of the flanges 16 on the sidewalls 4 and 6 such that they are flush with the outer edges of the flanges 16. The rails 22 extend the entire length of their respective sidewalls 4 and 6 and are attached to the flanges 16 by bolts 23. The rails 22 are preferably formed from 1¼-inch square steel tubing. Welded to the inside face of each rail 22 is a longitudinal cover plate 24 which likewise extends the length of the sidewalls 4 and 6 and overlies the flanges 16, covering the apertures 18 therein so that grain will not be lost through the stake holes. The front ends of the two side rails 22 abut against a transverse end rail 26 (FIGS. 2 and 3) which overlies the flange 16 on the front wall 8, and this rail is bolted to the flange 16 with its inside face flush with the inside surface of the wall 8. The end rail 26 is also preferably made from 1¼-inch square steel tubing and has its ends cut at an oblique angle. Intermediate its ends the end rail 26 is interrupted so that the rail is actually divided into two sections. One of the sections has a connecting stud 27 welded into it and projected beyond its end into the other section so that the two sections can telescope relative to each other and thereby accommodate truck bodies of different width.

Welded to the inside faces of the two side rails 22 are inclined mounting studs 28 (FIG. 3) which project inwardly and are inclined upwardly at a slight angle. The studs 28 on the two rails 22 align, that is they are located directly opposite from each other across the truck body B. The studs 28 are preferably made from square bar stock small enough to fit into 1¼-inch square tubing.

The mounting studs 28 secure the ends of bows 30 which bridge the open top of the body B. The bows 30 are bent midway between their ends such that their centers are located about 13 inches higher than their ends which are at the side rails 22. The bows 30 are likewise preferably formed from 1¼-inch square steel tubing and are long enough to reach from the mounting stud 28 on one side rail 22 to the corresponding mounting stud 28 on the other side rail 22. Indeed, the mounting studs 28 fit into the hollow ends of the bows 30, and the bows 30 and studs 28 are secured firmly together by bolts 32 which project through them. Since the mounting studs 28 project into the ends of the bows 30, a limited amount of telescoping can occur and this permits the side rails 22 to move inwardly or outwardly and thereby accommodate truck bodies of different widths. The forwardmost bow 30 is set slightly to the rear of the transverse end rail 26.

Extended over the bends at the midpoints of all the bows 30 is a ridge piece or center stringer 34 (FIG. 2) which at its forward end turns downwardly at a relatively steep angle toward the end rail 26. On each side of the center stringer 34 a pair of lateral stringers 36 are extended over the tops of the bows 30, and these stringers 34 are likewise turned downwardly at their forward ends toward the transverse end rail 26. All the stringers 34 and 36 are parallel with themselves and with the side rails 22 and are secured firmly to the bows 30 by bolts. The spacing between the two outer stringers 36 and the side rails 22 is somewhat less than the spacing between adjacent stringers 34 and 36 themselves. The stringers 34 and 36 are preferably formed from 1¼-inch square steel tubing.

Aside from the frame 20, the cover assembly C also includes flexible cover or tarpaulin 40 (FIG. 1) which is supported on the frame 20. When unfolded, the tarpaulin 40 is wide enough and long enough to completely cover the frame 20 and the open top with the side margins of the tarpaulin 40 being located below the flanges 16 (FIG. 3) of the sidewalls 4 and 6 and the rear margin below the flange 16 on the end wall 26. At its front margin, the tarpaulin 40 is compressed against the front face of the end rail 26 by a angle bar 42 (FIG. 5) held to the end rail 26 by bolts 44. Along its sides the tarpaulin 40 has tabs 46 (FIGS. 1 and 3) stitched to it, and these tabs project beyond the side margins and are provided with metal D-rings 48 at their outer ends. The tabs 46 at the front and rear of the tarpaulin 40 are slightly longer than the tabs 46 in the vicinity of the center of the tarpaulin 40. The tarpaulin when folded occupies only a small portion of the frame 20 generally above the front wall 8 so that grain can be directed into the body B through the large spaces between the bows 30 and stringers 34 and 36 of the frame 20.

At the front ends of the frame 20 bearing plates 52 (FIGS. 4 and 5) are attached firmly to the outside faces of the side rails 22. These plates project downwardly and forwardly with the lower ends being located somewhat in front of the front wall 8. Moreover, the plates 22 turn inwardly below the flange 16 so that the lower portions of them are located quite close to the sidewalls 4 and 6. The plates 52 have bearings 54 bolted to them at their lower ends and a single shaft 56 extends through the bearings 54. The shaft 56 is located slightly in front of the front wall 8 and adjacent to the bearing plate 52 at the sidewall 4 it is fitted with a sprocket 58. The sprocket 58 aligns with a sprocket 60 (FIG. 1) on a motor unit 62 which is bolted to the front wall 8 of the body B and comprises a reversible electric motor, a gear reduction, and a suitable mount. The motor of the unit 62 is electrically connected to the electrical system of the truck T and is operated from within the cab of the truck T. The sprocket 60 of the unit 62 is connected to the sprocket 58 of the shaft 56 through a chain 64. The motor unit 62 is reversible and when energized will rotate the shaft 56.

Bolted to the front wall 8 below the motor unit 62 is an upright bar 66 (FIG. 1) having a bearing 68 at its lower end, and this bearing supports another sprocket 70 which also aligns with the sprocket 58. The axle of the sprocket 70 is capable of receiving the end of a detachable hand crank 72 so that the sprocket 70 can be rotated manually with the crank. The crank 72 and sprocket 70 are strictly for emergency use. If the motor unit 62 fails to operate, it is removed from the front wall 8 and a longer chain 64 is trained around the sprockets 58 and 70. Then, when the crank 72 is turned, the shaft 56 will rotate.

The shaft 56 projects beyond the bearing plates 52 where each end of the shaft 56 is fitted with a sheave 74 (FIGS. 4 and 5). Due to the fact that the lower end of each plate 52 is offset inwardly from its upper end, the sheaves 74 are disposed generally beneath the flanges 16, and as a result do not project laterally any substantial distance beyond the side rails 22 of the frame 20. Each bearing plate 52, moreover, is provided with a pair of outwardly projecting tabs 76, one of which projects directly over the top of the adjacent sheave 74, while the other projects directly below the bottom of the sheave 74. Threaded into the tabs 76 are guide bolts 78 which are oriented generally radially with respect to the sheave 74 and by turning can be advanced toward or retracted from the circumferential groove of the sheave 74.

At its rear end, the frame 20 has more bearing plates 80 (FIG. 6) attached to the side rails 22, and these plates are quite similar to the plates 52. The plates 80, while projecting downwardly and having their lower ends offset inwardly from their upper ends, however, project rearwardly also so that their lower ends are at least in part projected beyond the rear wall 10 of the truck body B. The lower end of each rear bearing plate 80 is fitted with bearing 82 which is bolted in place and each bearing 82 receives an axle 84 on which a rear sheave 86 is mounted. The axle 84 for each bearing plate 80 does not project inwardly much beyond its bearing plate 80 so that the rear of the truck body B is not obstructed by the axles 84. The rear sheaves 86 are positioned outwardly from their respective bearing plates 80, but due to the offset in the plates 80, the sheaves 86 do not extend much if any beyond the side rails 22 of the frame 20. Moreover, the front and rear sheaves 74 and 86 at the sidewall 4 align as do the front and rear sheaves 74 and 86 at the sidewall 6. Each rear bearing plate 80 contains a vertical slot 88 in which aligned jamb nuts 90 are disposed. Threaded through the nuts 90 is an adjusting screw 92 which extends horizontally and has its rear end against the bearing 82 for that plate 80. When the nuts 90 are backed away from each other and then turned in the same direction, the screw 92 will move axially and change the position of the bearing 82, assuming of course that the bolts securing the bearing 82 to plate 80 have been loosened. This changes the spacing between the front and rear sheaves 74 and 86.

Extended between the front and rear sheaves 74 and 86 or each side of the body B are wire ropes or cables 94 (FIG. 1). Each cable 94 is trained one-half turn around its rear sheave 86 and 1½ times around its front sheave 74. At the front sheave 74 the guide bolts 78 project along side the upper and lower passes of the cable 94 as they leave the sheave 74 and prevent the cable from jumping across itself and becoming tangled on the sheave 74 as the shaft 56 rotates (FIG. 4). The upper or driving pass of the cable 94 extends through the D-rings 48 at the end of the tabs 46 along the sides of the tarpaulin 40 and the last tab 46, that is the one at the rear end of the tarpaulin 40, is secured to the cable 94 where the two ends of the cable 94 are joined to form the endless configuration (FIG. 6).

OPERATION

The truck body B is loaded with the tarpaulin 40 in its folded condition, in which case the entire tarpaulin 40 is disposed over and supported on the extreme front of the frame 20 and the open top of the truck body B is exposed through the remainder of the frame 20. The discharge chute of a combine or other grain conveying machine is directed toward the top of the body B from above the frame 20 and grain enters the body B through the large spaces between the bows 30 and stringers 34 and 36 of the frame 20. Since the frame 20 is higher over the center of the body B than at the sidewalls 4 and 6, it permits so-called heaping of the grain in the body B. Grain with a high moisture content and particularly corn exhibits a marked tendency to heap, that is accumulate at a greater height directly below the discharge end of the chute.

Once the truck body B is filled with grain, the truck is driven a short distance away from the loading chute and the motor unit 62 is energized such that it rotates the shaft 56 and the front sheaves 74 on that shaft in the direction which causes the upper passes of the two cables 94 to move toward their respective rear sheaves 86. As the upper passes of the two cables 94 move, the rearmost tabs 46 are dragged along with those cable passes and the rear end of the tarpaulin 40 is moved over the stringers 34 and 36. The remainder of the tarpaulin 40 unfolds with the D-rings 48 sliding over the upper passes of the cables 94. After about 30 seconds the rear end of the tarpaulin 40 reaches the rear wall 10 of the body B, and the tarpaulin 40 is completely spread out over the frame 20. Since the tabs 46 are shorter at the center of the tarpaulin 40 than at the ends, the upper passes of the cables 94 bow upwardly and exert downwardly directed forces on the sides of the tarpaulin 40. These forces maintain the tarpaulin 40 tight over the frame 20.

With the tarpaulin 40 spread over the frame 20, the load of grain is completely covered and the truck T may be driven at highway speeds without fear of loosing grain. Likewise, in the event of a rainstorm the grain will not be saturated.

Once the destination for the grain is reached, the operator merely energizes the motor unit 62 in the opposite direction. This causes the upper passes of the cables 94 to move toward the front sheaves 74 and carry the rear end of the tarpaulin 40 with them. As the tarpaulin 40 moves rearwardly it accumulates or gathers in folds with a fold forming generally at each tab 46. Eventually, the frame 20 for all intents and purposes is completely uncovered and the tarpaulin 40 rests in a compact folded condition at the front end of the frame 20.

Should the tarpaulin 40 encounter excessive resistance, the front sheaves 74 will merely slip within the 1½ turns of the cable 94. This protects the motor of the unit 62. If the motor unit 62 does not operate, the tarpaulin can still be folded and unfolded manually by using the handcrank 72. Indeed, the cover assembly C may be supplied without the motor unit 62, in which case it would be operated by the handcrank 72.

By using the cover assembly C the tarpaulin 40 can be folded and unfolded without climbing up onto the truck body B and without even touching the tarpaulin 40.

By slightly modifying the frame 20, the truck body B can be used for carrying large pieces of equipment such as the header on the front of the combine. In this regard, it should be recalled that the rear walls of most truck bodies designed for grain transport are removable, and that the frame 20 does not interfere with such removal. Usually, the combine header or other piece of equipment is suspended from a chain or wire rope of a hoist and lifted into the truck body B with a boom such as the boom on a combine. Normally, the boom is well above the top of the body B, but the header or other piece of equipment is small enough to fit completely within the body B. To accommodate the chain or wire rope from the boom, the rearmost bow is provided with a removable section 100 (FIG. 1) between the two lateral stringers 36 and closest to sidewall 4.

This invention is intended to cover all changes and modifications of the example of the invention herein chosen for purposes of the disclosure which do not constitute departures from the spirit and scope of the invention.

What is claimed is:

1. In combination with an open top truck body having upstanding spaced apart sidewalls, a cover assembly for covering the open top of the truck body; said cover assembly comprising: a plurality of rigid cross members extending across the truck body generally from one sidewall to the other sidewall at the top of the truck body, the cross members being fixed in position with respect to the truck body; a plurality of rigid and substantially inflexible stringers secured to the cross members and extending longitudinally of the truck body, the stringers extending over the cross members so that each stringer at the location where it crosses one of the underlying cross members is located above that underlying cross member; sheaves adjacent to the sidewalls at the front and rear ends of the stringers; an endless cable looped around the sheaves and extended along each sidewall opposite the outwardly presented faces of the sidewalls so as to have a driving pass and a return pass; a flexible cover extending over and supported on the stringers, the cover having ends and sides, one of the ends of the cover being fixed in position with respect to the truck body, the other end being attached to the driving passes of the endless cables, the cover having tabs along its sides with the tabs being connected to the endless cables such that the cables can slide along and can move relative to the sides of the cover but cannot be withdrawn from the cables, whereby the cables prevent the sides of the cover from moving inwardly away from the sidewalls of the truck body, the tabs near the ends of the cover being longer than the tabs near the center of the cover, whereby the cable will assume an upwardly bowed configuration when the cover is unfolded and will maintain the center of the cover taut; and means for rotating the sheaves to drive the cables in unison and in both directions so as to cause the cover to slide over the stringers, whereby the cover folds in one direction of movement and unfolds and spreads out over the top of the truck body in the other direction of movement.

* * * * *